(12) United States Patent
Halahmi

(10) Patent No.: US 9,220,255 B2
(45) Date of Patent: Dec. 29, 2015

(54) DEVICES AND METHODS FOR A DURABLE INSECT BAIT STATION

(71) Applicant: Westham Ltd., Tel Aviv (IL)

(72) Inventor: Izhar Halahmi, Hod Hasharon (IL)

(73) Assignee: Westham Ltd., Tel Aviv (IL)

( * ) Notice: Subject to any disclaimer, the term of this patent is extended or adjusted under 35 U.S.C. 154(b) by 212 days.

(21) Appl. No.: 13/792,266

(22) Filed: Mar. 11, 2013

(65) Prior Publication Data

US 2014/0130399 A1   May 15, 2014

Related U.S. Application Data

(60) Provisional application No. 61/724,323, filed on Nov. 9, 2012.

(51) Int. Cl.
    *A01M 1/20* (2006.01)
    *A01M 1/02* (2006.01)

(52) U.S. Cl.
    CPC .............. *A01M 1/2005* (2013.01); *A01M 1/02* (2013.01); *A01M 1/023* (2013.01); *A01M 1/20* (2013.01); *A01M 1/2016* (2013.01)

(58) Field of Classification Search
    CPC ......... A01M 1/00; A01M 1/02; A01M 1/023; A01M 1/20; A01M 1/2005; A01M 1/2011; A01M 1/2016
    USPC ........................................ 43/131, 132.1, 107
    See application file for complete search history.

(56) References Cited

U.S. PATENT DOCUMENTS 4,168,591 A * 9/1979 Shaw ............................... 43/114
4,322,862 A * 4/1982 Beuthling ....................... 449/48
(Continued)

FOREIGN PATENT DOCUMENTS

CA    2323057 A1 * 9/1999 ............. A01M 1/02
DE   10108179 A1 * 9/2002 ............. A01M 1/02
(Continued)

OTHER PUBLICATIONS

MR4 Staff; "Chapter 2: Anopheles Laboratory Biology and Culture, 2.4 Anopheles Culture, 2.4.8 Bloodfeeding-Membrane Apparatuses and Animals v 1"; MR4; Printed on Dec. 8, 2010; pp. 1-6; located at http://www.mr4.org/Portals/3/Pdfs/Anopheles/2.4.8%20Bloodfeeding-Membrane%20Apparatuses%20and%20Animals%20v%201.pdf.*

*Primary Examiner* — Darren W Ark
(74) *Attorney, Agent, or Firm* — Reuven K. Mouallem, LL.M.; FlashPoint IP Ltd.

(57) ABSTRACT

The present invention discloses devices and methods for a durable insect bait station. Such devices including a membrane for providing access to the bait station, the membrane adapted to be permeable to volatile components, the membrane configured to allow easy insect-probe penetration, and to be resistant to degradation caused by outdoor environmental conditions and/or harsh indoor environmental conditions. Preferably, the membrane has at least one inclusion. Preferably, the membrane has at least one perforation. Preferably, the device further includes a bait core for providing bait to the bait station, the bait core including a sugar-source bait, at least one oral and/or contact insect toxin, and a solvent, wherein the bait core is configured to be substantially in direct contact with the membrane. Most preferably, the bait core further includes an odorant. Most preferably, the bait core further includes a fibrous material as a support for the membrane.

17 Claims, 4 Drawing Sheets

(56) References Cited

U.S. PATENT DOCUMENTS

| | | | |
|---|---|---|---|
| 4,850,305 A * | 7/1989 | Georgi et al. | 119/6.6 |
| 5,133,289 A * | 7/1992 | Georgi | 119/6.6 |
| RE35,348 E * | 10/1996 | Georgi | 119/6.6 |
| 5,657,576 A * | 8/1997 | Nicosia | 43/132.1 |
| 5,685,109 A * | 11/1997 | Rimback | 43/107 |
| 6,088,949 A * | 7/2000 | Nicosia et al. | 43/132.1 |
| 6,601,337 B1 * | 8/2003 | McKenney, Sr. | 43/132.1 |
| 6,718,689 B1 * | 4/2004 | Kolibas | 43/131 |
| 7,743,552 B2 * | 6/2010 | Borth et al. | 43/131 |
| 7,988,984 B2 * | 8/2011 | Hockaday | 43/132.1 |
| 8,266,839 B2 * | 9/2012 | Bernard | 43/131 |
| 9,089,122 B2 * | 7/2015 | Olson | A01M 1/023 43/123 |
| 2009/0313883 A1 * | 12/2009 | Olson et al. | 43/131 |
| 2010/0192451 A1 * | 8/2010 | Ponnusamy et al. | 43/114 |
| 2012/0145081 A1 * | 6/2012 | Acar et al. | 119/6.5 |

FOREIGN PATENT DOCUMENTS

| | | | | |
|---|---|---|---|---|
| FR | 2852490 A1 * | 9/2004 | | A01M 1/02 |
| JP | 08131042 A * | 5/1996 | | A01M 1/02 |
| JP | 2000139318 A * | 5/2000 | | A01M 1/20 |
| JP | 2009183242 A * | 8/2009 | | A01M 1/02 |
| WO | WO 9717846 A1 * | 5/1997 | | A01M 1/00 |
| WO | WO 9944417 A3 * | 9/1999 | | A01M 1/02 |

* cited by examiner

DEVICES AND METHODS FOR A DURABLE INSECT BAIT STATION

CROSS REFERENCE TO RELATED APPLICATIONS

This patent application claims priority under 35 U.S.C. §119(e) to U.S. Provisional Patent Application No. 61/724,323 filed Nov. 9, 2012, which is hereby incorporated by reference in its entirety.

FIELD AND BACKGROUND OF THE INVENTION

The present invention relates to devices and methods for a durable insect bait station. In particular, the present invention relates to bait stations that are suitable for insects having a proboscis including moths, blood-sucking insects such as mosquitoes, and other biting flies.

Currently, bait stations are one of the most interesting and promising insect control techniques. A bait station is a device that is installed in a way that the targeted insects can feed on the bait, either outdoors or indoors.

Typical prior-art bait is a viscous substance or aqueous-gel mixture having an attractant, a substance that the insect uses as food (e.g., sugar or a carbohydrate solution), and a toxin (e.g., boric acid, spinosad, and dinotefurn). The bait formulation may further include preservatives and colorants. Such lures attract insects to feed on the bait, while the toxin enters the insect body during feeding (either by ingestion or contact), causing its death.

A major drawback of prior-art bait technologies is the sensitivity to outdoor environments, such as sunlight, dust, rain, dew, and cold flow due to gravity. Attempts to coat the bait with a membrane, such as the approaches taught in U.S. Pat. No. 6,601,337 by McKenney, Sr. and U.S. Pat. No. 6,718,689 by Kolibas, do not provide workable solutions due to membrane sensitivity to harsh and/or persistent heat and sunlight, and due to the relatively high hardness parameter of the membrane.

Sensitivity to heat and sunlight can cause cracking and loss of elasticity of the membrane. Cold flow of sugar bait causes loss of material and uneven distribution along the dimensions of the bait. Baits having no outer membrane tend to accumulate dust that sticks to the bait, while the sunlight's radiation (particularly in the UV range) can cause severe degradation within a short period of time of outdoor exposure. Such degradation causes severe loss of elasticity, hardening, and brittleness. The hardness of a membrane that is typical of the prior art can prevent many insect probes (i.e., proboscis) from being able to pierce the membrane, and penetrate into the bait. Moreover, the prior-art materials used as the "building blocks" for the membranes are actually impermeable to odorant molecules that need to migrate outside the membrane barrier in order to attract the insects. Furthermore, at least some of the prior-art membrane materials are susceptible to microbial attack.

It would be desirable to have such devices and methods for a durable insect bait station. Such devices and methods would, inter alia, would overcome the limitations described above by improving the resistance of membrane-coated baits to sunlight, dust, rain, dew, cold flow due to gravity, microbial attack, and hydrolysis, while allowing insects to detect (i.e., smell) odorants migrating outside of the bait, and allowing insects' probes to easily pierce the bait membrane and penetrate into the bait, particularly insects with delicate probes such as mosquitoes.

SUMMARY OF THE INVENTION

It is the purpose of the present invention to provide devices and methods for a durable insect bait station. It is noted that the term "exemplary" is used herein to refer to examples of embodiments and/or implementations, and is not meant to necessarily convey a more-desirable use-case. Similarly, the term "preferred" is used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Insect baits are typically syrup-like with characteristic liquid properties; thus, such baits are subject to sagging and gravity-driven loss from a reservoir or bait surface. Furthermore, the bait needs to make the food source (e.g., sugar) available to the insects; thus, a tacky exposed surface is often employed, which can quickly build up debris from dust and dead insects adsorbed/attached to the surface. Such debris can result in blocking a large portion of the bait surface, thereby reducing its effectiveness. Exposure to rain can also degrade bait performance by causing loss or deterioration of the bait itself.

Preferred embodiments of the present invention provide durable insect bait stations characterized, inter alia, by:
(1) improved rain erosion resistance;
(2) lower surface tack;
(3) reduced sagging and tendency to cold flow due to gravity;
(4) improved resistance to degradation by microorganisms;
(5) better resistance to hydrolysis; and
(6) easier membrane penetrability by insect probes, including mosquitoes.

Therefore, according to the present invention, there is provided for the first time a device for a durable insect bait station, the device including: (a) a membrane for providing access to the bait station, the membrane adapted to be permeable to volatile components, the membrane configured to allow easy insect-probe penetration, and the membrane configured to be resistant to degradation caused by outdoor environmental conditions and/or harsh indoor environmental conditions.

Preferably, the membrane has a thickness of less than about 50 microns.

Preferably, the membrane has a thickness of less than about 100 microns.

Preferably, the membrane has a hardness of less than about 50 Shore A.

Preferably, the membrane has a hardness of less than about 60 Shore A.

Preferably, the membrane has at least one inclusion.

Preferably, the membrane has at least one perforation.

Most preferably, at least one perforation has an aperture diameter of less than about 100 micron.

Preferably, the device further includes: (b) a bait core for providing bait to the bait station, the bait core including a sugar-source bait, at least one oral and/or contact insect toxin, and a solvent, wherein the bait core is configured to be substantially in direct contact with the membrane.

Most preferably, the bait core further includes an odorant.

Most preferably, the bait core further includes a fibrous material as a support for the membrane.

According to the present invention, there is provided for the first time a method for providing a durable insect bait station, the method including the step of: (a) providing a membrane for access to the bait station, wherein the membrane is adapted to be permeable to volatile components, wherein the membrane is configured to allow easy insect-probe penetration, and wherein the membrane is configured to be resistant to degradation caused by outdoor environmental conditions and/or harsh indoor environmental conditions.

Preferably, the membrane has a thickness of less than about 50 microns.

Preferably, the membrane has a thickness of less than about 100 microns.

Preferably, the membrane has a hardness of less than about 50 Shore A.

Preferably, the membrane has a hardness of less than about 60 Shore A.

Preferably, the membrane has at least one inclusion.

Preferably, the membrane has at least one perforation.

Most preferably, at least one perforation has an aperture diameter of less than about 100 micron.

Preferably, the method further includes the step of: (b) providing a bait core to the bait station, wherein the bait core includes a sugar-source bait, at least one oral and/or contact insect toxin, and a solvent, and wherein the bait core is configured to be substantially in direct contact with the membrane.

Most preferably, the bait core further includes an odorant.

Most preferably, the bait core further includes a fibrous material as a support for the membrane.

According to the present invention, there is provided for the first time a method for providing a durable insect bait station, the method including the step of: (a) applying a membrane to be substantially in direct contact with a bait core, wherein the membrane is adapted to be permeable to volatile components, wherein the membrane is configured to allow easy insect-probe penetration, wherein the membrane is configured to be resistant to degradation caused by outdoor environmental conditions and/or harsh indoor environmental conditions, and wherein the bait core includes a sugar-source bait, at least one oral and/or contact insect toxin, and a solvent.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to devices and methods for a durable insect bait station. The principles and operation for such devices and methods, according to the present invention, may be better understood with reference to the accompanying description and drawings.

Figure 1:
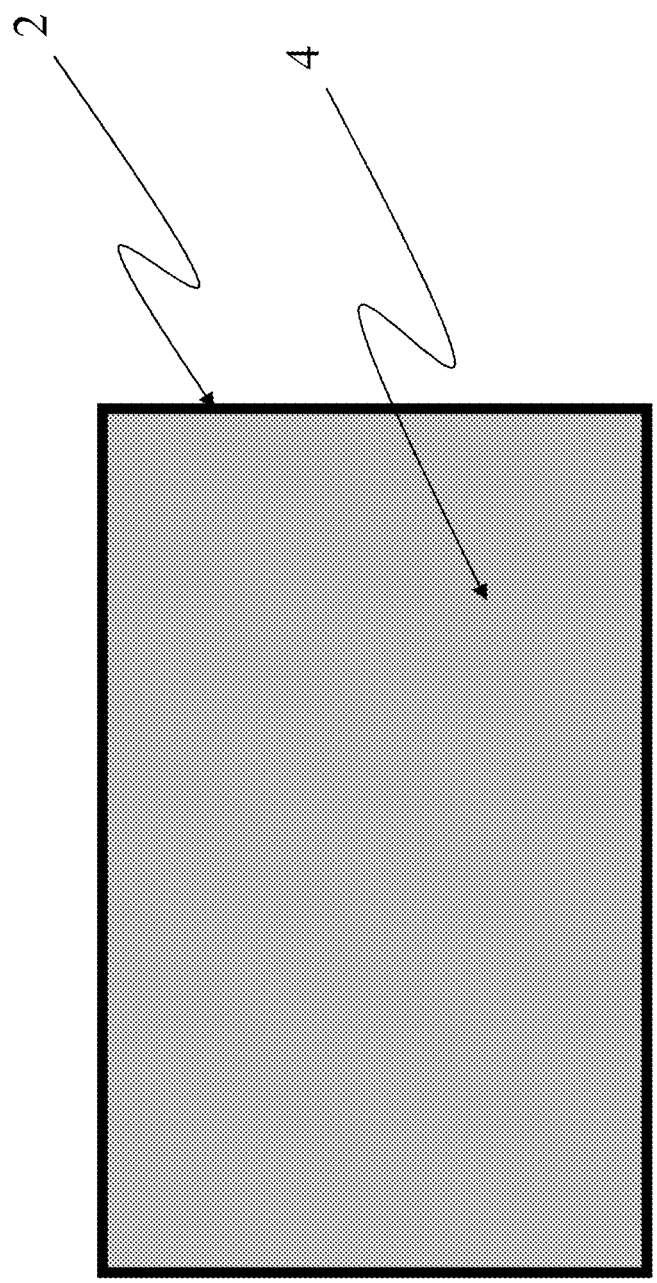
FIG. 1 is a simplified, cross-sectional schematic diagram of a durable insect bait station having a non-perforated membrane, according to preferred embodiments of the present invention.

Referring now to the drawings, FIG. 1 is a simplified, cross-sectional schematic diagram of a durable insect bait station having a non-perforated membrane, according to preferred embodiments of the present invention. The durable insect bait station is shown having a durable outer membrane or skin OM 2 which encapsulates a bait core BC 4. BC 4 includes a sugar-source bait, at least one oral and/or contact insect toxin, water or other solvent, and optionally, an odorant or other volatile material (OD) as an insect attractant.

OM 2 is non-perforated in the embodiment shown in FIG. 1 in order to prevent rain (or other moisture) from causing the sugar source in BC 4 to swell or wash away (i.e., erode). However, OM 2 is permeable to the volatile components of any OD optionally implemented, enabling the durable insect bait station to attract insects from a distance. OM 2 is configured to be thin enough and soft enough to allow an insect probe to pierce the bait skin. OM 2 is strong and elastic, while being supple enough to allow insect-probe penetration.

Adapting polymeric materials to the requirements detailed above for OM 2 is a multi-faceted assessment. Most elastomers that are UV-resistant are hard, and do not allow insect-probe penetration (e.g., carbon black-filled butyl rubber or acrylic polymer). However, many soft elastomers are plasticized with low molecular-weight plasticizers that can be leached out by rain and dew (e.g., plasticized PVC). A large number of such soft elastomers will not be resistant to UV exposure and microbial attack (e.g., polyurethanes, neoprene, natural rubber, and butadiene rubber).

Surprisingly, some specific elastomers exhibit the required UV resistance, softness and low resistance to insect-probe piercing, hydrolytic stability, permeability to odorant vapors, resistance to microbial attack, and resistance to rain erosion. Such soft elastomer candidates include: polydimethyl siloxanes (PDMS) polymers; silicone rubber; aliphatic polyurethanes including those plasticized by high molecular-weight plasticizers that resist leaching and migration; ethylene-vinyl acetate; ethylene-acrylic ester copolymers and terpolymers; ethylene-propylene rubber; plastomers (especially ethylene-hexene and ethylene-octene copolymers); thermoplastic vulcanized rubber (TPV); hydrogenated block styrene-ethylene butylenes (SEBS); and block styrene isoprene (SIBS).

In addition to such polymeric materials, OM 2 may include: high molecular-weight aliphatic plasticizers; UV stabilizers; light stabilizers; carbon black; pigments and dyes; filler; and bactericides, fungicides, and other microbial-activity suppressants.

In preferred embodiments of the present invention, OM 2 has a Shore hardness of up to about 90 Shore A. In other preferred embodiments, OM 2 has a Shore hardness of up to about 65 Shore A. In other preferred embodiments, elastomers used for OM 2 have a Shore hardness of up to about 45 Shore A. In some preferred embodiments, OM 2 has a hardness of lower than 45 Shore A.

Examples for preferred elastomers suitable for making OM 2 include: silicone rubbers; silicone elastomers; and silicone gels; such as Silastic L RTV and DC 7091 manufactured by Dow Corning, and Silopren LSR 2530 and Silopren LSR 2742 manufactured by Momentive Performance Materials.

An example for preferred polyurethanes suitable for making OM 2 include Desmopan DP85085A manufactured by Bayer, which can be plasticized by polymeric aliphatic polyester plasticizer (10-20% weight plasticizer). An example for preferred ethylene-acrylic ester copolymers suitable for making OM 2 include Lotryl 37EH550, manufactured by Arkema, which can be plasticized for further softness by mineral oil.

In preferred embodiments of the present invention, the thickness of OM 2 varies from about 1-300 microns. In other preferred embodiments, the thickness of OM 2 varies from about 1-100 microns. In preferred embodiments in which the bait is configured to kill small insects, such as mosquitoes, the thickness of OM 2 varies from about 1-50 microns. Surprisingly, when the thickness of OM 2 varies from about 1-50 microns, and Shore hardness is less than about 60 Shore A, a mosquito's probe can easily penetrate OM 2.

Preferred embodiments of the present invention provide methods for configuring OM 2 onto BC 4. Such methods include:
(1) dissolving or dispersing at least one polymer (e.g., a thermoplastic, a thermosetting polymer, and mixtures thereof) in a solvent to form a solution, dispersion, or emulsion (referred to hereinafter as SOL);
(2) applying the SOL onto BC 4 by spraying, dipping, brushing, doctor-blade spreading, rolling, or gravure; and
(3) drying the solvent from the SOL to obtain the durable insect bait station.

Alternate embodiments of the present invention provide methods for configuring OM 2 onto BC 4 by:
(1) dissolving or dispersing at least one polymer (e.g., a thermoplastic, a thermosetting polymer, and mixtures thereof) in a solvent to form a solution, dispersion, or emulsion (referred to hereinafter as SOL);
(2) applying the SOL onto a fabric, cloth, fibrous tissue, a paper, or a mat by spraying, dipping, brushing, doctor-blade spreading, rolling, or gravure;
(3) drying the solvent from the SOL to obtain a composite skin having a fibrous non-continuous phase in an elastomeric matrix (referred to hereinafter as ELASCOMP); and
(4) attaching the ELASCOMP to at least one face of BC 4 to obtain the durable insect bait station.

Other alternate embodiments of the present invention provide methods for configuring OM 2 onto BC 4 by:
(1) dissolving or dispersing at least one polymer (e.g., a thermoplastic, a thermosetting polymer, and mixtures thereof) in a solvent to form a solution, dispersion, or emulsion (referred to hereinafter as SOL);
(2) applying the SOL onto a mold or a tool (i.e., a surface that does not stick to the dried SOL) by spraying, dipping, brushing, doctor-blade spreading, rolling, or gravure;
(3) drying the solvent from the SOL to obtain a composite skin;
(4) peeling the skin from the mold or tool; and
(5) attaching the skin to at least one face of BC 4 to obtain the durable insect bait station.

In some embodiments, the SOL includes at least one polymer such that the solution is characterized by a weight-to-weight (w-w) concentration of 0.1-100% of polymer to solution. In other embodiments, the SOL includes no solvent (referred to hereinafter as a 100%-solids SOL). Examples of such 100%-solids SOL include at least one polymer such as monomeric and/or oligomeric polyurethane, acrylate, methacrylate, amino resin, silicone, and urethane-acrylate.

Figure 2:
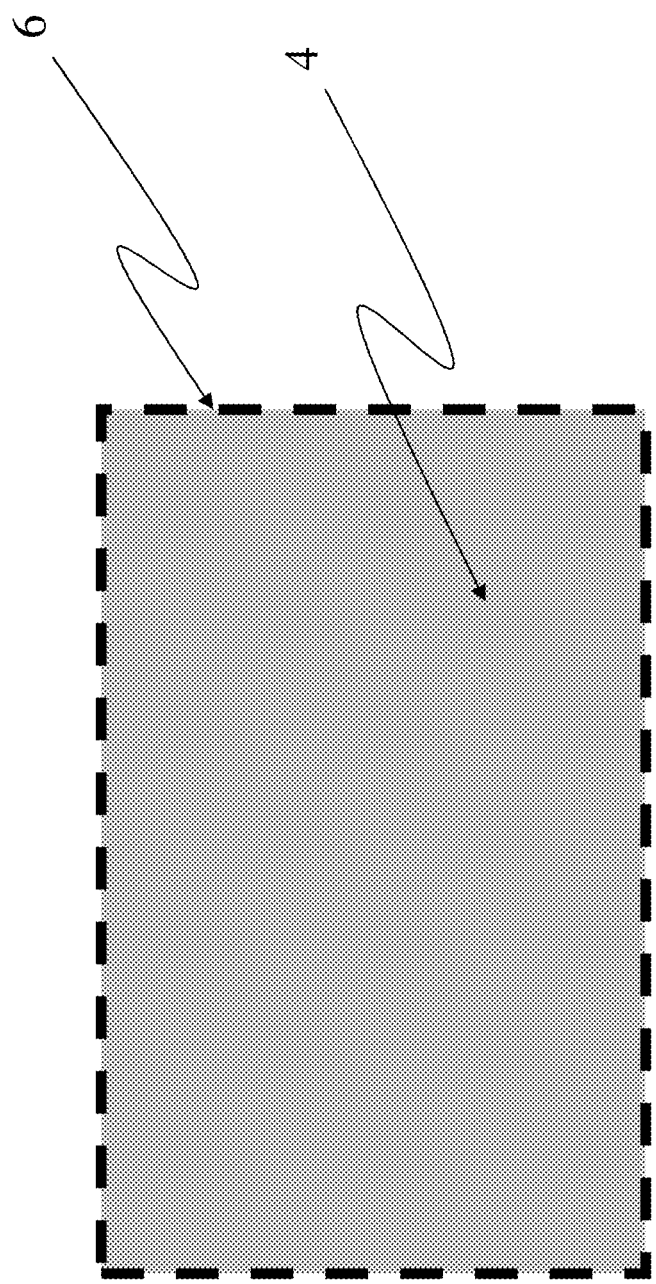
FIG. 2 is a simplified, cross-sectional schematic diagram of a durable insect bait station having a perforated membrane, according to preferred embodiments of the present invention.
Figure 3:
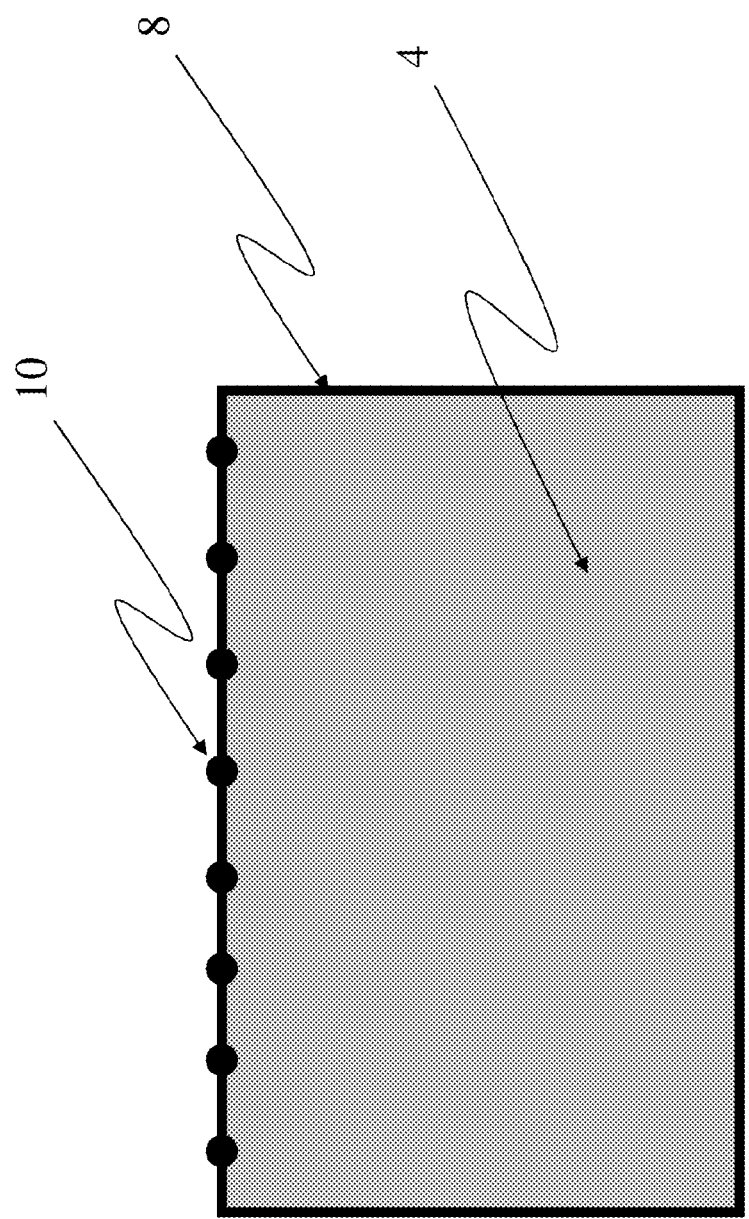
FIG. 3 is a simplified, cross-sectional schematic diagram of a durable insect bait station having a membrane with inclusions, according to preferred embodiments of the present invention.
Figure 4:
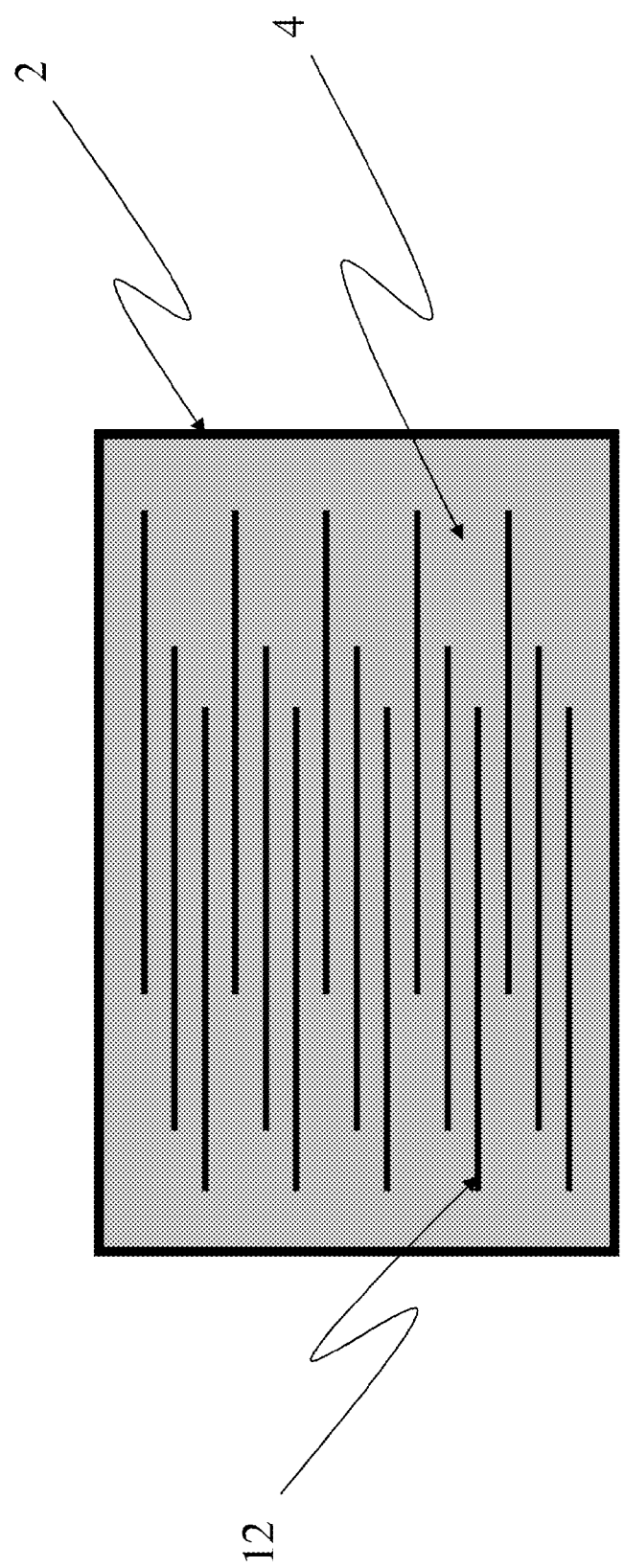
FIG. 4 is a simplified, cross-sectional schematic diagram of a durable insect bait station with the bait core mixed with or impregnated into a plurality of fibrous material, according to preferred embodiments of the present invention.

FIG. 2 is a simplified, cross-sectional schematic diagram of a durable insect bait station having a perforated membrane, according to preferred embodiments of the present invention. A perforated OM 6 prevents prevent rain (or other moisture) from causing the sugar source in BC 4 to swell. However, OM 6 is very permeable to the volatile components of an OD, enabling the durable insect bait station to attract insects from a distance. The perforation of OM 6 is configured to allow easy insect-probe penetration.

In some embodiments of the present invention, OM 6 is perforated by applying a physical or chemical process to the dried skin. Examples for physical perforation include puncturing, laser drilling and sand blasting. An example for chemical perforation includes the dispersal of particles of a water-soluble compound (such as sugar or salt) in OM 6, which is then exposed to water or steam to dissolve the particles, leaving holes in OM 6.

In some embodiments, the aperture diameter (or average diameter, if irregular in shape) of the perforations in OM 6 varies from about 0.1 micron to 1 millimeter. In other embodiments, the aperture diameter (or average diameter, if irregular in shape) varies from about 1-50 microns. In some embodiments, the average perforation density varies between about 0.01-1 million apertures/cm$^2$.

Such perforations enable, inter alia, the insect bait to: increase diffusion of an OD from BC 4 to the exterior of OM 6 in order to attract insects; and ease penetration of an insect probe to BC 4 by providing weakened points in the surface of OM 6. Perforation size and frequency is optimized in order to enhance diffusion of an OD to the outside, and allow easier insect-probe penetration through OM 6, while retaining resistance to rain, dust adsorption, dew, and sunlight to a greater extent than baits without a protective membrane.

FIG. 3 is a simplified, cross-sectional schematic diagram of a durable insect bait station having a membrane with inclusions, according to preferred embodiments of the present invention. A "doped" OM 8 is shown having inclusions 10 (additionally or alternatively to perforations) in order to enhance diffusion of an OD from BC 4 to the outside; and allow easier insect-probe penetration through OM 8. Inclusions 10 (only depicted on one side of OM 8 in FIG. 3) can be formed, for example, by mixing the SOL with solid particles or a liquid-immiscible substance such that inclusions 10 are left in the matrix of OM 8 after removal of solvent from the membrane solution. Inclusions 10 are characterized by being mechanically weaker and/or chemically more permeable to an OD, relative to a non-modified membrane.

Inclusions 10 may be adsorbed on, absorbed in, impregnated in, or coated on OM 8. Examples of modifiers for forming inclusions 10 in OM 8 from solid particles include: talc, zeolites, fumed silica, starch, cellulose, clay, calcium carbonate, wax, paraffin, soap, fatty-acid amide, fatty-acid salt, and air. Examples of modifiers for forming inclusions 10 in OM 8 from liquid substances include: vegetable oil, paraffin oil, plasticizer, silicone fluid, water, glycol, glycerol, alcohol, sugar, fatty-acid ester, non-ionic surfactants.

FIG. 4 is a simplified, cross-sectional schematic diagram of a durable insect bait station with the bait core mixed with or impregnated into a plurality of fibrous material, according to preferred embodiments of the present invention. A fibrous material made of fibrous cloths or sheets, or a folded roll or sheet is included in BC 4 to provide improved sagging resistance to BC 4, especially when the insect bait is applied on vertical or sloped surfaces.

The improved sagging resistance is obtained by adsorption of the sugar-source bait of BC 4 into a cloth, fabric, paper, open-pore foam or fibrous mat (referred to hereinafter as MAT 12); and/or impregnating MAT 12 with the sugar-source bait. In some embodiments, MAT 12 includes fibers or whiskers of cotton, straw, bamboo, pineapple, ramie, cellulose, hemp, flax, sisal, coir, paper, wood, stems, leaves, rayon, polyester, polyamide, polyacrylonitrile, viscose, jute, polypropylene, polyethylene, and lyocell.

In other embodiments, MAT 12 includes open-cell polyurethane foam, polyurea foam, melamine foam, silicone foam, or polyolefin foam. In other embodiments, the weight ratio between the sugar-source bait of BC 4 and MAT 12 varies from about 0.01-100. The sugar-source bait of BC 4 is integrated with MAT 12 by dipping, pressing, spraying, squeezing, roller coating, vacuum impregnating, and/or molding under pressure the sugar-source bait onto MAT 12.

While the present invention has been described with respect to a limited number of embodiments, it will be appreciated that many variations, modifications, and other applications of the present invention may be made.

What is claimed is:

1. A device for a durable insect bait station, the device comprising:
   (a) an elastomeric membrane for providing access to the bait station, said membrane adapted to be permeable to volatile components, said membrane configured to allow easy insect-probe penetration for mosquitoes and other biting flies, said membrane having a hardness of less than about 60 Shore A and a thickness of less than about 100 microns, and said membrane configured to be resistant to degradation caused by ultraviolet (UV) exposure, wherein said membrane is composed of at least one elastomeric material selected from the group consisting of: polydimethyl siloxanes (PDMS) polymers, silicone rubber, aliphatic polyurethanes including those plasticized by high molecular-weight plasticizers that resist leaching and migration, ethylene-vinyl acetate, ethylene-acrylic ester copolymers and terpolymers, ethylene-propylene rubber, plastomers including ethylene-hexene and ethylene-octene copolymers, thermoplastic vulcanized rubber (TPV), hydrogenated block styrene-ethylene butylenes (SEBS), and block styrene isoprene (SIBS); and
   (b) a bait core for providing bait to the bait station, said bait core including a sugar-source bait, at least one oral and/or contact insect toxin, and a solvent, wherein said bait core is configured to be substantially in direct contact with said membrane.

2. The device of claim 1, wherein said membrane has a thickness of less than about 50 microns.

3. The device of claim 1, wherein said membrane has a hardness of less than about 50 Shore A.

4. The device of claim 1, wherein said membrane has at least one inclusion.

5. The device of claim 1, wherein said membrane has at least one perforation.

6. The device of claim 5, wherein said at least one perforation has an aperture diameter of at less than about 100 micron.

7. The device of claim 1, wherein said bait core further includes an odorant.

8. The device of claim 1, wherein said bait core further includes a fibrous material as a support for said membrane.

9. A method for providing a durable insect bait station, the method comprising the step of:
   (a) providing an elastomeric membrane for access to the bait station, wherein said membrane is adapted to be permeable to volatile components, wherein said membrane is configured to allow easy insect-probe penetration for mosquitoes and other biting flies, wherein said membrane has a hardness of less than about 60 Shore A and a thickness of less than about 100 microns, and wherein said membrane is configured to be resistant to degradation caused by ultraviolet (UV) exposure, wherein said membrane is composed of at least one elastomeric material selected from the group consisting of: polydimethyl siloxanes (PDMS) polymers, silicone rubber, aliphatic polyurethanes including those plasticized by high molecular-weight plasticizers that resist leaching and migration, ethylene-vinyl acetate, ethylene-acrylic ester copolymers and terpolymers, ethylene-propylene rubber, plastomers including ethylene-hexene and ethylene-octene copolymers, thermoplastic vulcanized rubber (TPV), hydrogenated block styrene-ethylene butylenes (SEBS), and block styrene isoprene (SIBS); and
   (b) providing a bait core to the bait station, wherein said bait core includes a sugar-source bait, at least one oral and/or contact insect toxin, and a solvent, and wherein said bait core is configured to be substantially in direct contact with said membrane.

10. The method of claim 9, wherein said membrane has a thickness of less than about 50 microns.

11. The method of claim 9, wherein said membrane has a hardness of less than about 50 Shore A.

12. The method of claim 9, wherein said membrane has at least one inclusion.

13. The method of claim 9, wherein said membrane has at least one perforation.

14. The method of claim 13, wherein said at least one perforation has an aperture diameter of less than about 100 micron.

15. The method of claim 9, wherein said bait core further includes an odorant.

16. The method of claim 9, wherein said bait core further includes a fibrous material as a support for said membrane.

17. A method for providing a durable insect bait station, the method comprising the step of:
   (a) applying an elastomeric membrane to be substantially in direct contact with a bait core, wherein said membrane is adapted to be permeable to volatile components, wherein said membrane is configured to allow easy insect-probe penetration for mosquitoes and other biting flies, wherein said membrane has a hardness of less than about 60 Shore A and a thickness of less than about 100 microns, wherein said membrane is configured to be resistant to degradation caused by ultraviolet (UV) exposure, and wherein said bait core includes a sugar-source bait, at least one oral and/or contact insect toxin, and a solvent, wherein said membrane is composed of at least one elastomeric material selected from the group consisting of: polydimethyl siloxanes (PDMS) polymers, silicone rubber, aliphatic polyurethanes including those plasticized by high molecular-weight plasticizers that resist leaching and migration, ethylene-vinyl acetate, ethylene-acrylic ester copolymers and terpolymers, ethylene-propylene rubber, plastomers including ethylene-hexene and ethylene-octene copolymers, thermoplastic vulcanized rubber (TPV), hydrogenated block styrene-ethylene butylenes (SEBS), and block styrene isoprene (SIBS).

* * * * *